(12) United States Patent
Isowaki

(10) Patent No.: US 12,020,726 B2
(45) Date of Patent: Jun. 25, 2024

(54) MAGNETIC REPRODUCTION PROCESSING DEVICE, MAGNETIC RECORDING/REPRODUCING DEVICE, AND MAGNETIC REPRODUCING METHOD

(71) Applicant: KABUSHIKI KAISHA TOSHIBA, Tokyo (JP)

(72) Inventor: Yousuke Isowaki, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/161,438

(22) Filed: Jan. 30, 2023

(65) Prior Publication Data

US 2024/0071421 A1 Feb. 29, 2024

(30) Foreign Application Priority Data

Aug. 31, 2022 (JP) .................. 2022-138505

(51) Int. Cl.
| | |
|---|---|
| *G11B 5/00* | (2006.01) |
| *G11B 5/09* | (2006.01) |
| *G11B 20/10* | (2006.01) |
| *G11B 20/12* | (2006.01) |
| *G11B 20/18* | (2006.01) |

(52) U.S. Cl.
CPC .... *G11B 20/1833* (2013.01); *G11B 20/10046* (2013.01); *G11B 20/1217* (2013.01); *G11B 2020/10787* (2013.01); *G11B 2020/1222* (2013.01); *G11B 2020/1863* (2013.01)

(58) Field of Classification Search
CPC .......... G11B 27/36; G11B 20/10; G11B 5/09; G11B 20/1419; G11B 20/0013; G11B 5/59633; G11B 5/00; G11B 20/10046; G11B 20/10027; G11B 5/02
USPC ........................................ 360/65, 68, 39, 55
See application file for complete search history.

(56) References Cited

U.S. PATENT DOCUMENTS

| | | | |
|---|---|---|---|
| 10,382,067 B2 | 8/2019 | Sharon et al. | |
| 10,804,938 B2 | 10/2020 | Qin | |
| 10,896,114 B2 | 1/2021 | Savanur | |
| 11,017,761 B2 * | 5/2021 | Peng | G10L 25/30 |

* cited by examiner

*Primary Examiner* — Nabil Z Hindi
(74) *Attorney, Agent, or Firm* — Finnegan, Henderson, Farabow, Garrett & Dunner, LLP

(57) ABSTRACT

According to one embodiment, a magnetic reproduction processing device includes a decoder. The decoder includes a convolutional layer including a plurality of filters, and an attention layer configured to derive a degree of contribution related to the filters. The decoder is configured to output a decoded result obtained by integrating results of processing an input signal with the filters according to the degree of contribution.

19 Claims, 3 Drawing Sheets

MAGNETIC REPRODUCTION PROCESSING DEVICE, MAGNETIC RECORDING/REPRODUCING DEVICE, AND MAGNETIC REPRODUCING METHOD

CROSS-REFERENCE TO RELATED APPLICATIONS

This application is based upon and claims the benefit of priority from Japanese Patent Application No. 2022-138505, filed on Aug. 31, 2022; the entire contents of which are incorporated herein by reference.

FIELD

Embodiments described herein generally relate to a magnetic reproduction processing device, a magnetic recording/reproducing device, and a magnetic reproducing method.

BACKGROUND

For example, fewer errors are desired in magnetic replay processors.

DETAILED DESCRIPTION

Figure 1:
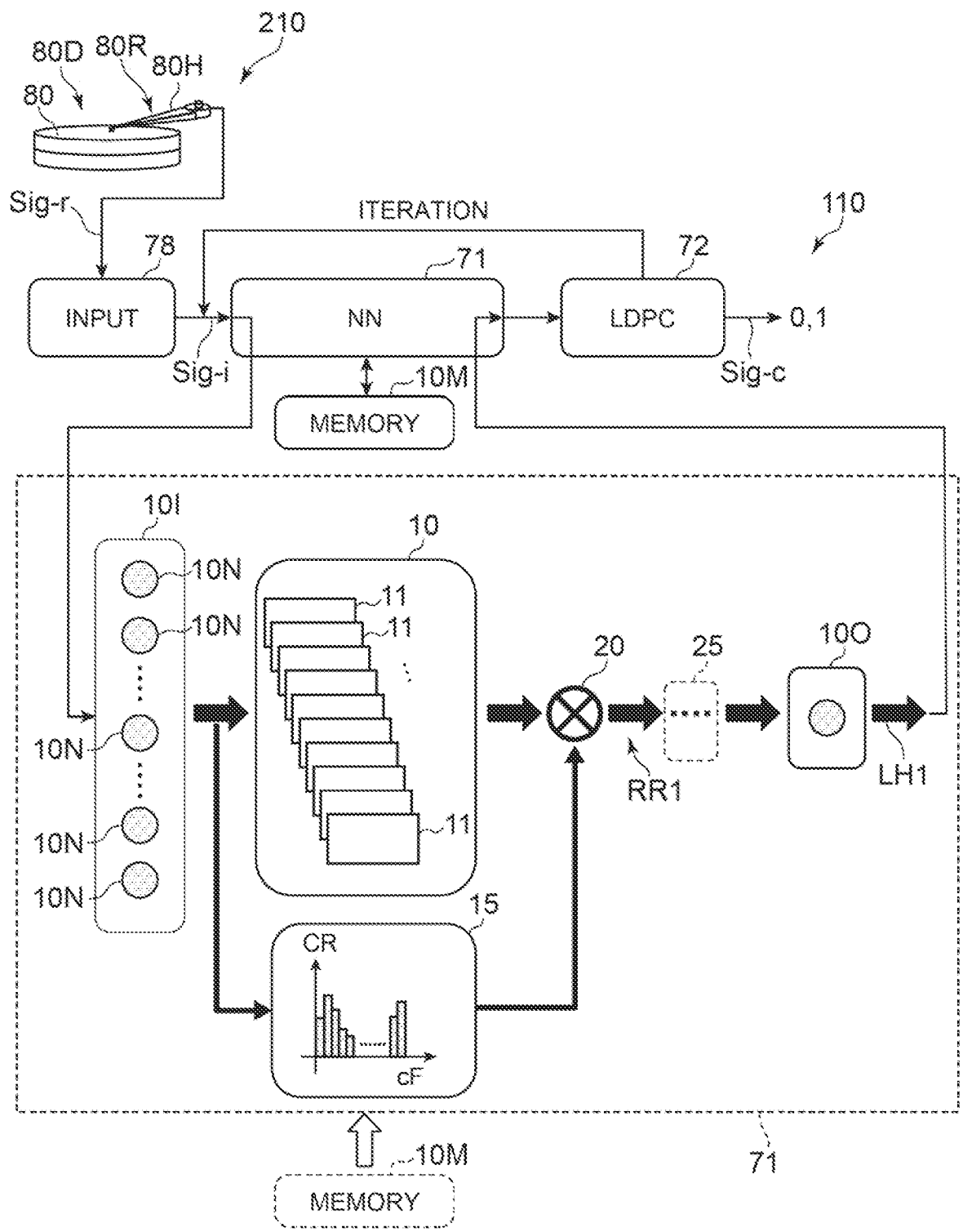
FIG. 1 is a schematic diagram illustrating a magnetic reproduction processing device and a magnetic recording/reproducing device according to a first embodiment.

According to one embodiment, a magnetic reproduction processing device includes a decoder. The decoder includes a convolutional layer including a plurality of filters, and an attention layer configured to derive a degree of contribution related to the filters. The decoder is configured to output a decoded result obtained by integrating results of processing an input signal with the filters according to the degree of contribution.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously in an antecedent drawing are marked with like reference numerals, and a detailed description is omitted as appropriate.

First Embodiment

FIG. 1 is a schematic diagram illustrating a magnetic reproduction processing device and a magnetic recording/reproducing device according to the first embodiment.

As shown in FIG. 1, a magnetic recording/reproducing device 210 according to the embodiment includes a magnetic reproduction processing device 110 according to the embodiment. The magnetic recording/reproducing device 210 may further include a magnetic recording/reproducing portion 80D.

The magnetic recording/reproducing portion 80D includes a magnetic recording medium 80. The magnetic recording medium 80 may include, for example, a magnetic disk (HDD: Hard Disk Drive). The magnetic recording/reproducing portion 80D may include, for example, an SSD (Solid State Drive). The magnetic recording/reproducing portion 80D may include, for example, the recording/reproducing portion 80R. The recording/reproducing portion 80R may include, for example, a magnetic head 80H. Information is recorded on the magnetic recording medium 80 by the recording/reproducing portion 80R (magnetic head 80H). Information recorded on the magnetic recording medium 80 is reproduced by the recording/reproducing portion 80R (magnetic head 80H). A reproduced signal Sig-r is obtained from the recording/reproducing portion 80R.

The reproduced signal Sig-r obtained by the magnetic recording/reproducing portion 80D (recording/reproducing portion 80R) is supplied to the magnetic reproduction processing device 110. The reproduced signal Sig-r is processed (decoded) by the magnetic reproduction processing device 110. A result (decoding process) processed by the magnetic reproduction processing device 110 is output from the magnetic reproduction processing device 110 as a decoded signal Sig-c. The decoded signal Sig-c is, for example, a binary signal "1,0".

The magnetic reproduction processing device 110 includes a decoder 71. The magnetic reproduction processing device 110 includes an input interface 78, for example. The reproduced signal Sig-r or a signal based on the reproduced signal Sig-r is supplied to the decoder 71 via an input interface 78. An input signal Sig-i including the reproduced signal Sig-r is supplied to the decoder 71. The input signal Sig-i (for example, the reproduced signal Sig-r) may be a time-series continuous or discontinuous signal.

As shown in FIG. 1, the decoder 71 includes a convolutional layer 10 and an attention layer 15. As described below, the decoder 71 may include an input layer 10I, a connected layer 20 and an output layer 10O.

The convolutional layer 10 includes a plurality of filters 11. The attention layer 15 is configured to derive a degree of contribution CR for multiple filters 11.

The decoder 71 is configured to output a decoded result RR1 obtained by integrating the results of processing the input signal Sig-i by the plurality of filters 11 according to the degree of contribution CR. Thereby, decoding with higher accuracy can be performed.

For example, a first reference example in which Viterbi decoding is performed to PRML (Partial Response Maximum Likelihood) can be considered. As will be described later, the decoding accuracy may not be sufficient in the first reference example. On the other hand, for example, a second reference example is considered in which the input signal Sig-i is processed by one filter in the decoder 71. In the second reference example, one filter is used such that the entire input signal Sig-i is properly processed. In the second reference example, the decoding accuracy may be insufficient depending on the state of the input signal Sig-i.

In contrast, in the embodiment, the decoding is performed using the results of processing the input signal Sig-i with the multiple filters 11. Thereby, decoding with high accuracy is possible. According to the embodiment, it is possible to provide a magnetic reproduction processing device capable of suppressing errors.

As shown in FIG. 1, the magnetic reproduction processing device 110 may include a storage 10M. The storage 10M is configured to store a coefficient related to multiple filters 11. The coefficient is, for example, a "weight". The attention layer is configured to derive the degree of contribution CR using the coefficient stored in the storage 10M. The attention layer 15 is configured to estimate the degree of contribution CR, for example.

As shown in FIG. 1, the attention layer 15 estimates the degree of contribution CR corresponding to the number cF of the multiple filters 11 based on the coefficient stored in the storage 10M.

In the embodiment, the coefficients stored in the storage 10M may be determined by machine learning, for example.

The multiple filters 11 may be optimized by machine learning, for example. The decoder 71 includes, for example, an NN (neural network) structure. For example, the attention layer 15 may include a NN (neural network). The convolutional layer 10 may include, for example, a CNN (Convolutional Neural Network).

As shown in FIG. 1, the decoder 71 may further include an input layer 10I. The input signal Sig-i is input to the input layer 10I. The input signal Sig-i input to the input layer 10I is supplied to the convolutional layer 10 and the attention layer 15.

As shown in FIG. 1, the decoder 71 may further include a connected layer 20. The connected layer 20 connects the processing result of the convolutional layer 10 and the processing result of the attention layer 15. For example, the results of processing the input signal Sig-i with the multiple filters 11 are integrated according to the degree of contribution CR. For example, the product of the result of processing the input signal Sig-i by the multiple filters 11 and the degree of contribution CR is calculated. A sum of the calculated products is calculated. The processing result (decoded result RR1) by the connected layer 20 may be output. The decoded result RR1 may include likelihood information.

As shown in FIG. 1, the processing result (decoded result RR1) of the connected layer 20 may be supplied to other layer 25. In other layer 25, for example, at least some of the multiple processing results may be combined. The processing results of other layer 25 can be provided to the output layer 10O.

As shown in FIG. 1, the decoder 71 may further include an output layer 10O. The output layer 10O is configured to output an output information LH1 based on the decoded result RR1. The output information LH1 includes, for example, likelihood proportion.

In the embodiments, the degree of contribution CR estimated by the attention layer 15 may be changed depending on the state of the input signal Sig-i. The state of the input signal Sig-i is, for example, a signal waveform. The state of the input signal Sig-i may be, for example, the length of the signal.

For example, the input signal Sig-i (reproduced signal Sig-r) includes a reproduced signal of $N_kT$. "T" is the minimum recording unit (minimum recording period) in reproduction (and recording). "k" is an integer of 1 or more. For example, the reproduced signal Sig-r includes signals such as "1T", "2T", ..., "10T".

For example, the input signal Sig-i includes a reproduced signal of $N_iT$ and a reproduced signal of $N_jT$. "i" is an integer of 1 or more. "j" is an integer of 1 or more. "j" is different from "i". For example, the degree of contribution CR for the reproduced signal of $N_iT$ is different from the degree of contribution CR for the reproduced signal of $N_jT$. For example, the coefficients for the reproduced signal in $N_iT$ are different from the coefficients for the reproduced signal in $N_jT$.

As shown in FIG. 1, the magnetic reproduction processing device 110 may further include an error correction decoder 72. As described above, the decoder 71 may further include the output layer 10O. The output layer 10O is configured to output the output information LH1 based on the decoded result RR1. The output information LH1 may be provided to error correction decoder 72. Errors are corrected in the error correction decoder 72. The error correction decoder 72 may include, for example, an LDPC (Low-Density Parity-Check Codes) decoder.

As shown in FIG. 1, the output of the error correction decoder 72 is can be provided to the decoder 71 as part of input signal Sig-i. Errors are suppressed more by repeating processing.

In the embodiment, the number of input nodes 10N in the input layer 10I may be, for example, not less than 5 and not more than 300,000.

In the embodiment, the number of multiple filters 11 may be, for example, not less than 2 and not more than 1000.

As shown in FIG. 1, attention layer 15 may be configured to acquire, in parallel with the convolutional layer 10, at least a part of the input signal Sig-i.

Figure 2:
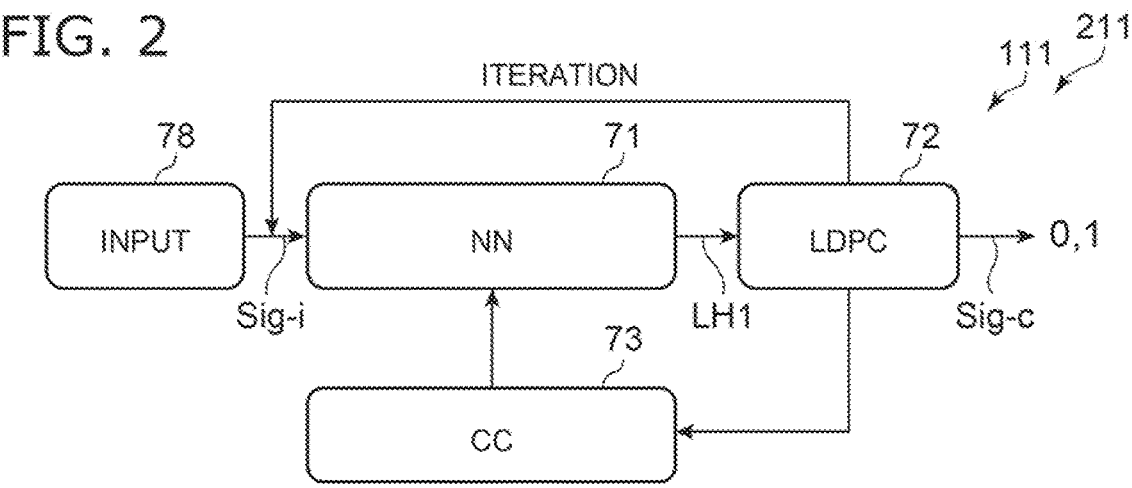
FIG. 2 is a schematic diagram illustrating the magnetic reproduction processing device and the magnetic recording/reproducing device according to the first embodiment.

FIG. 2 is a schematic diagram illustrating the magnetic reproduction processing device and the magnetic recording/reproducing device according to the first embodiment.

As shown in FIG. 2, in a magnetic recording/reproducing device 211 according to the embodiment, a magnetic reproduction processing device 111 further includes a contribution adjuster 73. Except for this, the configuration of the magnetic reproduction processing device 111 may be the same as the configuration of the magnetic reproduction processing device 110.

The contribution adjuster 73 is configured to adjust the contributions CR related to the multiple filters 11. The contribution adjuster 73 adjusts the contributions CR of at least a part of the multiple filters 11 based on at least a part of the processing results of the error correction decoder 72. In this example, at least a part of the processing result of the error correction decoder 72 is supplied to the contribution adjuster 73. In the embodiment, the method of adjusting the degree of contribution CR in the contribution adjuster 73 may be variously modified. For example, the degree of contribution CR may be adjusted according to the characteristics of the target magnetic recording/reproducing portion 80D. Better decoding can be performed.

Figure 3:
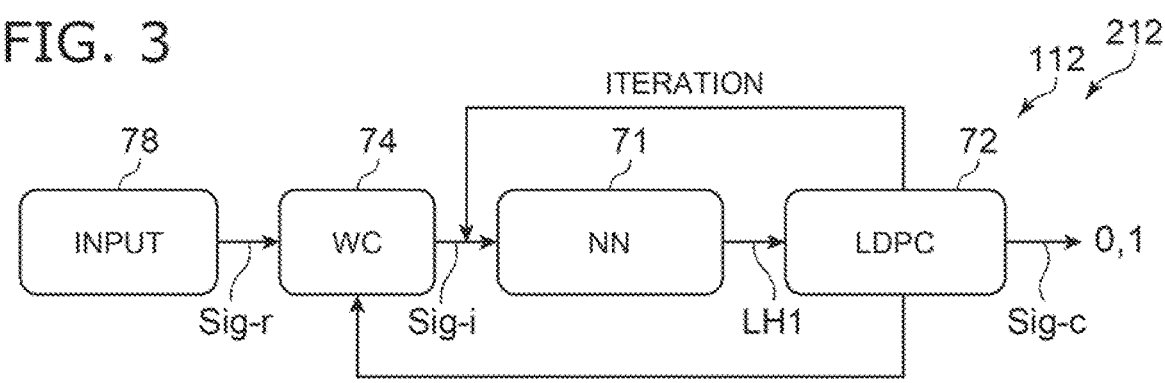
FIG. 3 is a schematic diagram illustrating a magnetic reproduction processing device and a magnetic recording/reproducing device according to the first embodiment.

FIG. 3 is a schematic diagram illustrating a magnetic reproduction processing device and a magnetic recording/reproducing device according to the first embodiment.

As shown in FIG. 3, in a magnetic recording/reproducing device 212 according to the embodiment, a magnetic reproduction processing device 112 further includes a waveform controller 74 (WC: Waveform controller). Except for this, the configuration of the magnetic reproduction processing device 112 may be the same as the configuration of the magnetic reproduction processing device 110.

The decoder 71 is configured to acquire the input signal Sig-i after being adjusted by the waveform controller 74. For example, the waveform controller 74 acquires the reproduced signal Sig-r, adjusts the waveform of the reproduced signal Sig-r, and outputs the waveform of the reproduced signal Sig-r being adjusted as the input signal Sig-i. The decoder 71 (e.g., input layer 10I) may be configured to acquire the input signal Sig-i adjusted by waveform controller 74. For example, the waveform is adjusted in accordance with the characteristics of the target magnetic recording/reproducing portion 80D. Better decoding is possible. The waveform controller 74 may include, for example, an FIR (Finite Impulse Response).

Figure 4:
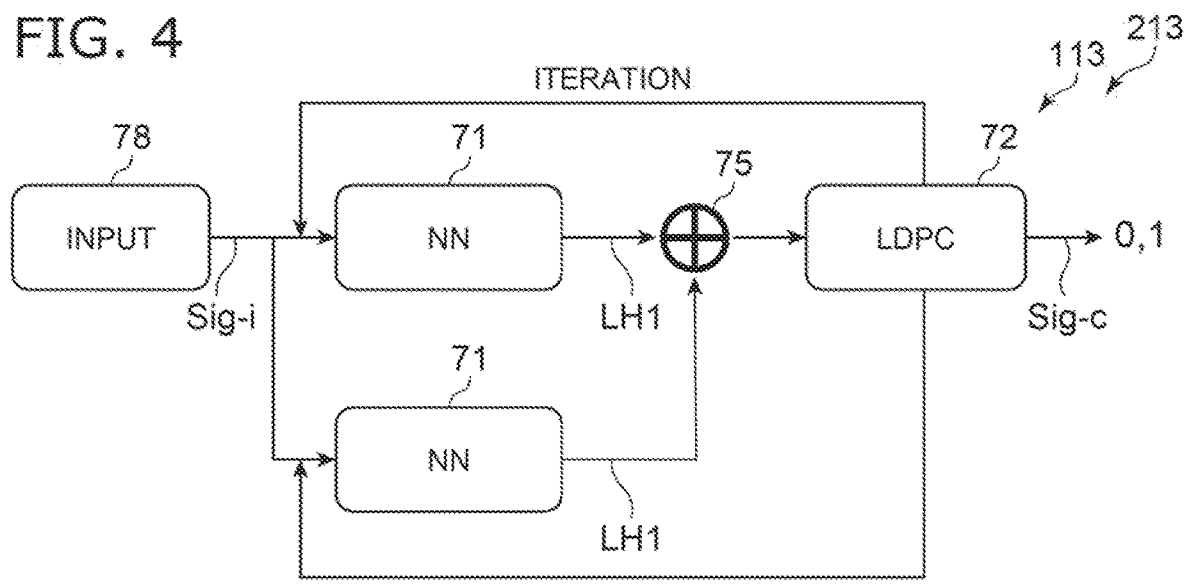
FIG. 4 is a schematic diagram illustrating a magnetic reproduction processing device and a magnetic recording/reproducing device according to the first embodiment.

FIG. 4 is a schematic diagram illustrating a magnetic reproduction processing device and a magnetic recording/reproducing device according to the first embodiment.

As shown in FIG. 4, in a magnetic recording/reproducing device 213 according to the embodiment, a magnetic reproduction processing device 113 includes a plurality of decoders 71. Except for this, the configuration of the magnetic reproduction processing device 113 may be the same as the configuration of the magnetic reproduction processing device 110.

In the magnetic reproduction processing device 113, the multiple decoders 71 are capable of parallel processing. The results of processing by multiple decoders 71 are combined by a combiner 75. The output of combiner 75 is provided to the error correction decoder 72. Thus, for example, the combiner 75 can combine the decoded result RR1 obtained from one of the plurality of decoders 71 and the decoded result RR1 obtained from another one of the plurality of decoders 71. For example, the combiner 75 combines the output information LH1 (e.g., likelihood proportion) from one of the plurality of decoders 71 with the output information LH1 (e.g., likelihood proportion) from another one of the plurality of decoders 71. The combined result by combiner 75 is provided to the error correction decoder 72. The results of the processing by the error correction decoder 72 may be supplied to multiple decoders 71. Better decoding is possible. For example, faster processing is possible.

For example, a first learning condition of one of the plurality of decoders 71 is different from a second learning condition of another of the plurality of decoders 71. In one example, a first error function in the first learning condition is different from a second error function in the second learning condition. In one example, a sequence of the multiple learning data values in the first learning condition is different from a sequence of the multiple learning data values in the second learning condition. For example, in the first learning condition and the second learning condition, the sequence of the learning data values is in reverse. For example, in the learning, the reproduction signal Sig-r is used as learning data. The reproduced signal Sig-r is expressed as multiple signal strength values at multiple times. The learning data includes the first value to k-th values. "k" is an integer greater than or equal to 2. The "k" corresponds to the time. In the first learning condition, the learning is performed in the direction from the first value to the k-th value. In the second learning condition, the learning is performed in the direction from the k-th value to the first value. More appropriate decoding is possible by processing the learning data by multiple decoders 71 under different learning conditions.

Figure 5:
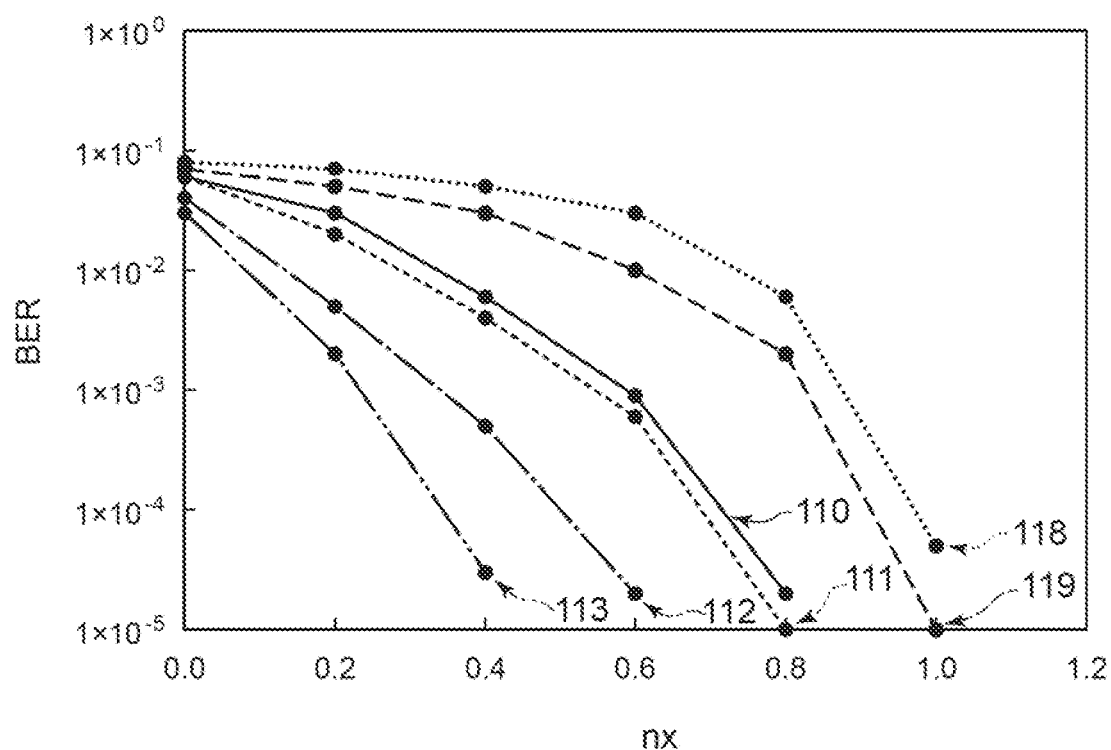
FIG. 5 is a graph illustrating characteristics of the magnetic reproduction processing device.

FIG. 5 is a graph illustrating characteristics of the magnetic reproduction processing device.

FIG. 5 illustrates the characteristics of the magnetic reproduction processing devices 110-113. Furthermore, FIG. 5 also illustrates the characteristics of a magnetic reproduction processing device 118 of a first reference example and the characteristics of a magnetic reproduction processing device 119 of a second reference example. In the magnetic reproduction processing device 118, Viterbi decoding using a PR filter is performed. The decoding in the first reference example corresponds to the number of filters being one. In the magnetic reproduction processing device 119 of the second reference example, the reproduction signal is processed by one filter. The first reference example corresponds to a configuration in which the decoder 71 is replaced with a Viterbi decoder. The second reference example corresponds to a configuration in which the decoder 71 processes with one filter. Except for the above, the configurations of the magnetic reproduction processing device 118 and the magnetic reproduction processing device 119 are the same as the configuration of the magnetic reproduction processing device 110. The horizontal axis of FIG. 5 represents the repetition number nx of the process. The repetition number nx is normalized and described. The vertical axis in FIG. 5 is BER (Bit Error Rate).

In the example of FIG. 5, the input layer 10I has 11 nodes and number of channel is 1. The number of filters 11 included in the convolutional layer 10 is 15. In the other layer 25 (e.g., a fully connected layer), the number of layers is 5 and the number of nodes is 10. The number of output nodes in the output layer 10O is 1. In this example, the attention layer 15 is a fully connected layer, in which the number of the layer is 5, the number of input layers is 11, and the number of the output nodes is 15. The output of attention layer 15 is a softmax output.

As shown in FIG. 5, in the magnetic reproduction processing devices 110 to 113 according to the embodiment, a BER lower than the BER in the magnetic reproduction processing device 118 of the first reference example and the magnetic reproduction processing device 119 of the second reference example is obtained. The BER in the magnetic reproduction processing device 111 is lower than the BER in the magnetic reproduction processing device 110. The BER in the magnetic reproduction processing device 112 is lower than the BER in the magnetic reproduction processing device 111. The BER in the magnetic reproduction processing device 113 is lower than the BER in the magnetic reproduction processing device 112.

The magnetic reproduction processing device according to the embodiment may include a computer.

Figure 6:
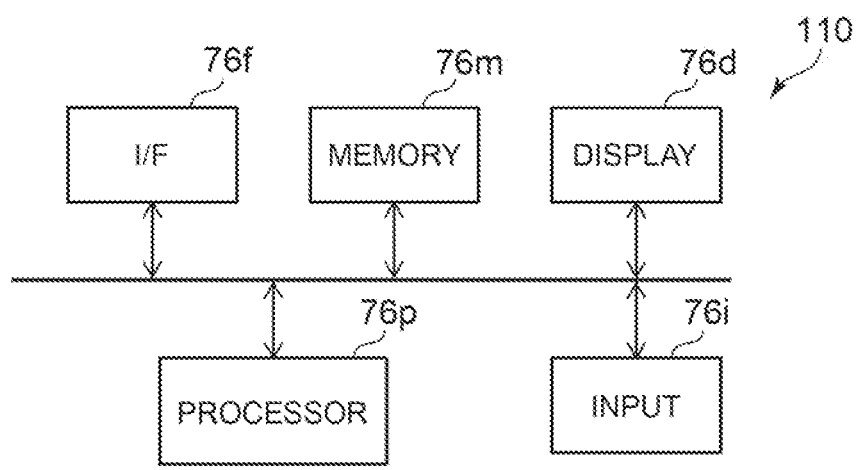
FIG. 6 is a schematic diagram illustrating a magnetic reproduction processing device according to the embodiment.

FIG. 6 is a schematic diagram illustrating a magnetic reproduction processing device according to the embodiment.

As shown in FIG. 6, the magnetic reproduction processing device (for example, the magnetic reproduction processing device 110) according to the embodiment may include a processing circuit 76p, a memory circuit 76m, an interface circuit 76f, and the like. The processing circuit 76p is, for example, an electric circuit. The memory circuit 76m may include, for example, at least one of ROM (Read Only Memory) and RAM (Random Access Memory). As the memory circuit 76m, for example, a part of the magnetic recording/reproducing portion 80D may be used.

The magnetic reproduction processing device (for example, the magnetic reproduction processing device 110) according to the embodiment may include a display device 76d, an input device 76i, and the like. The display device 76d may include various displays. The input device 76i includes, for example, a device having operation functions (e.g., keyboard, mouse, touch input panel, voice recognition input device, etc.).

A plurality of elements included in the magnetic reproduction processing device (for example, the magnetic reproduction processing device 110) according to the embodiment can communicate with each other by at least one of wireless or wired methods. The locations where the plurality of elements included in the magnetic reproduction processing device 110 are provided may be different from each other. For example, a general-purpose computer may be used as the magnetic reproduction processing device 110. For example, a plurality of computers connected to each other may be used as the magnetic reproduction processing device 110. A dedicated circuit may be used as at least part of the magnetic reproduction processing device 110. As the magnetic reproduction processing device 110, for example, a plurality of circuits connected to each other may be used.

The embodiments may include a program. The program causes the computer (magnetic reproduction processing device 110) to perform the above operations. The embodiments may include a storage medium storing the above program.

Second Embodiment

The second embodiment relates to a magnetic reproducing method. The magnetic reproducing method according to the embodiment is a method using the magnetic reproduction processing device (for example, magnetic reproduction processing device 110 to 113) according to the first embodiment and modifications thereof. It is possible to provide a magnetic reproducing method capable of suppressing errors.

The embodiments may include the following configurations (for example, technical proposals).

Configuration 1

A magnetic reproduction processing device, comprising:
a decoder,
the decoder including
a convolutional layer including a plurality of filters, and
an attention layer configured to derive a degree of contribution related to the filters,
the decoder being configured to output a decoded result obtained by integrating results of processing an input signal with the filters according to the degree of contribution.

Configuration 2

The processing device according to Configuration 1, further comprising:
a storage configured to store a coefficient related to the filters,
the attention layer being configured to derive the degree of contribution using the coefficient.

Configuration 3

The processing device according to Configuration 1 or 2, wherein the decoded result includes likelihood information.

Configuration 4

The processing device according to any one of Configurations 1 to 3, wherein the input signal includes a reproduced signal obtained from a magnetic recording/reproducing portion.

Configuration 5

The processing device according to any one of Configurations 1 to 4, wherein
the input signal includes a reproduced signal of $N_iT$ and a reproduced signal of $N_jT$,
the "T" is the minimum recording unit in reproducing,
the "i" is an integer of 1 or more,
the "j" is an integer of 1 or more,
the "j" is different from the "i", and
the degree of contribution for the reproduced signal of the $N_iT$ is different from the degree of contribution for the reproduced signal of the $N_jT$.

Configuration 6

The processing device according to any one of Configurations 1 to 5, wherein
the decoder further includes an output layer,
the output layer is configured to output an output information based on the decoded result, and
the output information includes likelihood proportion.

Configuration 7

The processing device according to any one of Configurations 1 to 5, further comprising:
an error correction decoder,
the decoder further including an output layer,
the output layer being configured to output an output information based on the decoded result, and
the output information being configured to be supplied to the error correction decoder.

Configuration 8

The processing device according to Configuration 7, wherein an output of the error correction decoder is configured to be provided to the decoder as part of the input signal.

Configuration 9

The processing device according to any one of Configurations 1 to 8, wherein a number of the filters is not less than 2 and not more than 1000.

Configuration 10

The processing device according to any one of Configurations 1 to 9, wherein the attention layer is configured to acquire at least a part of the input signal in parallel with the convolutional layer.

Configuration 11

The processing device according to any one of Configurations 1 to 10, wherein
the decoder further includes an input layer,
the input signal is input to the input layer,
the input signal input to the input layer is supplied to the convolutional layer and the attention layer, and
the number of input nodes in the input layer is not less than 5 and not more than 300,000.

Configuration 12

The processing device according to any one of Configurations 1 to 10, further comprising a waveform controller, and
the decoder being configured to acquire the input signal after being adjusted by the waveform controller.

Configuration 13

The processing device according to any one of Configurations 1 to 12, further comprising a contribution adjuster,
the contribution adjuster being configured to operate to adjust the degree of contribution for the filters.

Configuration 14

The processing device according to any one of Configurations 1 to 13, further comprising a combiner,
a plurality of the decoder being provided, and
the combiner being configured to combine a decoded result acquired from one of the plurality of decoders and a decoded result acquired from another one of the plurality of decoders.

Configuration 15

The processing device according to any one of Configurations 1 to 13, wherein
a plurality of the decoders are provided, and
a first learning condition in one of the plurality of decoders is different from a second learning condition in another one of the plurality of decoders.

Configuration 16

The processing device according to Configuration 15, wherein a first error function in the first learning condition is different from a second error function in the second learning condition.

Configuration 17

The processing device according to Configuration 15, wherein a sequence of the plurality of learning data values in the first learning condition is different from a sequence of the plurality of learning data values in the second learning condition.

Configuration 18

The processing device according to any one of Configurations 1 to 15, wherein the decoder includes a neural network structure.

Configuration 19

A magnetic recording/reproducing device, comprising: the magnetic reproduction processing device according to Configuration 4; and the magnetic recording/reproducing portion.

Configuration 20

A magnetic reproducing method using the magnetic reproduction processing device according to any one of Configurations 1 to 18.

According to the embodiments, it is possible to provide a magnetic reproduction processing device, a magnetic recording/reproducing device, and a magnetic reproducing method that can suppress errors.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in the magnetic reproduction processing devices such as decoders, error correction decoders, waveform controllers, contribution adjusters, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic reproduction processing devices, all magnetic recording/reproducing devices, and all magnetic reproducing method practicable by an appropriate design modification by one skilled in the art based on the magnetic reproduction processing devices, the magnetic recording/reproducing device, and the magnetic reproducing method described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic reproduction processing device, comprising:
   a decoder,
   the decoder including
      a convolutional layer including a plurality of filters, and
      an attention layer configured to derive a degree of contribution related to the filters,
   the decoder being configured to output a decoded result obtained by integrating results of processing an input signal with the filters according to the degree of contribution,
   wherein
      the input signal includes a reproduced signal of $N_iT$ and a reproduced signal of $N_jT$,
      the "T" is the minimum recording unit in reproducing,
      the "i" is an integer of 1 or more,
      the "j" is an integer of 1 or more,
      the "j" is different from the "i", and
      the degree of contribution for the reproduced signal of the $N_iT$ is different from the degree of contribution for the reproduced signal of the $N_jT$.

2. The device according to claim 1, further comprising:
   a storage configured to store a coefficient related to the filters,
   the attention layer being configured to derive the degree of contribution using the coefficient.

3. The device according to claim 1, wherein the decoded result includes likelihood information.

4. The device according to claim 1, wherein the input signal includes a reproduced signal obtained from a magnetic recording/reproducing portion.

5. The device according to claim 1, wherein
   the decoder further includes an output layer,
   the output layer is configured to output an output information based on the decoded result, and
   the output information includes likelihood proportion.

6. A magnetic reproduction processing device, comprising:
   a decoder; and
   an error correction decoder,
   the decoder including
      a convolutional layer including a plurality of filters, and
      an attention layer configured to derive a degree of contribution related to the filters,
   the decoder being configured to output a decoded result obtained by integrating results of processing an input signal with the filters according to the degree of contribution,
   the decoder further including an output layer,
   the output layer being configured to output an output information based on the decoded result, and
   the output information being configured to be supplied to the error correction decoder.

7. The device according to claim 6, wherein an output of the error correction decoder is configured to be provided to the decoder as part of the input signal.

8. The device according to claim 1, wherein a number of the filters is not less than 2 and not more than 1000.

9. The device according to claim 1, wherein the attention layer is configured to acquire at least a part of the input signal in parallel with the convolutional layer.

10. A magnetic reproduction processing device, comprising:

a decoder,
the decoder including
a convolutional layer including a plurality of filters, and
an attention layer configured to derive a degree of contribution related to the filters,
the decoder being configured to output a decoded result obtained by integrating results of processing an input signal with the filters according to the degree of contribution,
wherein the decoder further includes an input layer,
the input signal is input to the input layer,
the input signal input to the input layer is supplied to the convolutional layer and the attention layer, and
the number of input nodes in the input layer is not less than 5 and not more than 300,000.

11. The device according to claim 1, further comprising a waveform controller, and
the decoder being configured to acquire the input signal after being adjusted by the waveform controller.

12. The device according to claim 1, further comprising a contribution adjuster,
the contribution adjuster being configured to operate to adjust the degree of contribution for the filters.

13. The device according to claim 1, further comprising a combiner,
a plurality of the decoder being provided, and
the combiner being configured to combine a decoded result acquired from one of the plurality of decoders and a decoded result acquired from another one of the plurality of decoders.

14. The device according to claim 1, wherein
a plurality of the decoders are provided, and
a first learning condition in one of the plurality of decoders is different from a second learning condition in another one of the plurality of decoders.

15. The device according to claim 14, wherein a first error function in the first learning condition is different from a second error function in the second learning condition.

16. The device according to claim 14, wherein a sequence of the plurality of learning data values in the first learning condition is different from a sequence of the plurality of learning data values in the second learning condition.

17. The device according to claim 1, wherein the decoder includes a neural network structure.

18. A magnetic recording/reproducing device, comprising:
the magnetic reproduction processing device according to claim 4; and
the magnetic recording/reproducing portion.

19. A magnetic reproducing method using the magnetic reproduction processing device according to claim 1.

* * * * *